Patented June 15, 1954

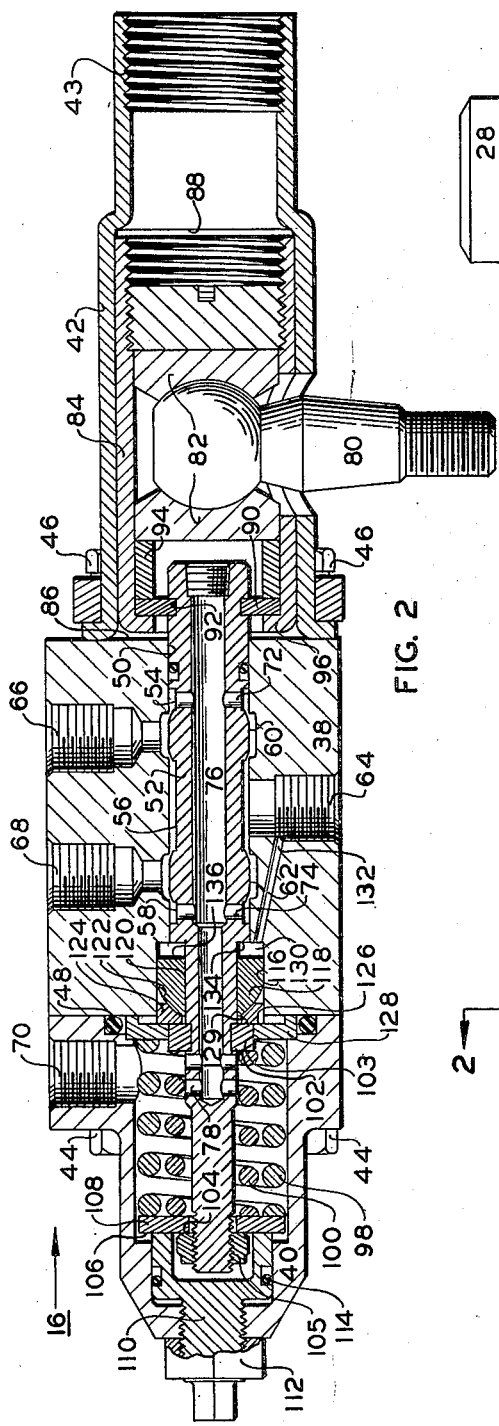

2,681,045

UNITED STATES PATENT OFFICE 2,681,045

MOTOR DISTRIBUTING VALVE WITH A LOAD FEEL AREA

Ernst F. Klessig, Berkley, and Glenn M. Jones, Farmington, Mich., assignors to Vickers Incorporated, Detroit, Mich., a corporation of Michigan Application June 28, 1952, Serial No. 296,144

13 Claims. (Cl. 121—41)

This invention relates to power transmissions, and is particularly applicable to those of the type comprising two or more fluid pressure energy translating devices, one of which may function as a pump and another as a fluid motor.

The invention more particularly relates to power transmissions adapted for use in servo applications such as power steering the dirigible wheels of a vehicle.

Most designers of power steering systems for use in motor vehicles have endeavored to retain as nearly as possible the same handling characteristics as in the conventional manual system. This requires a follow-up type of system having "feel." By follow-up it is meant that the controlled member follows whatever movement is imparted to the controlling member, and "feel" means that the manual effort applied by the driver to the controlling member determines the force applied to the controlled member.

The type of control valve which has found the widest use in such systems has been the type having a neutral central position and being shiftable therefrom in opposite directions to effect opposite movement of a fluid motor connected to the vehicle dirigible wheels. Such valves are usually provided with spring centering means to restore the valve to neutral position on removal of the shifting force. When "feel" is to be provided, one method is to add to the restoring force of the centering springs a hydraulically produced force, also tending to restore, or center, the valve, which is of a magnitude proportional to the force applied to the dirigible wheels. It is important in such valves that the centering means act to restore the valve to precisely the effective neutral position; otherwise improper steering will result. If the centered position of the valve is not made adjustable, machining tolerances must be very closely controlled, thus making the valve expensive to manufacture. Provisions made in the past for such adjustments have, however, been complex and difficult to manipulate, requiring a number of operations.

It is an object of the present invention to provide an improved low cost control valve particularly well suited for use in a power steering system.

It is a further object to provide a spring centered control valve, the center position of which is adjustable by a single simple adjustment.

It is also an object of the present invention to provide in a control valve having a neutral central position a novel hydraulic centering device to apply a restoring force to the valve when shifted from that central position.

Further objects and advantages of the present invention will be apparent from the following description, reference being had to the accompanying drawing wherein a preferred form of the present invention is clearly shown.

In the drawing:

Figure 1 is an end elevation of a control valve embodying a preferred form of the present invention.

Figure 2 is a section taken on line 2—2 of Figure 1.

Figure 3 is a schematic drawing illustrating the present invention utilized in a typical vehicle steering application.

Referring first to Figure 3 there is shown a pump 10 connected to a tank 12 by an inlet conduit 14 and to a control valve 16, embodying the present invention, by a delivery conduit 18. Control valve 16 is connected to the tank 12 by a return conduit 19. A pair of motor conduits 20 and 22 connect the control valve to ports 23 and 25 at opposing ends of a double-acting fluid motor 24 secured to the motor vehicle frame at 26. Motor 24 is connected to the tie rod 30 through part of a bell crank 36 to exert hydraulically produced steering force on the vehicle dirigible wheel 28. Pitman arm 32 acts on valve 16 to apply mechanical steering force to the wheel 28 through the valve 16, drag link 34, bell crank 36, and tie rod 30, and to control the application of hydraulically produced steering force as hereinafter described.

Referring now to Figures 1 and 2 the construction of the control valve 16 is there illustrated. The valve comprises a body 38 having an end cap 40 and a sleeve 42 secured thereto by bolts 44 and nuts 46. Sleeve 42 is threaded at 43 to provide for connection of drag link 34. An O ring seal 48 insures a fluidtight juncture of the end cap 40 and the body 38. Body 38 has a stepped valve bore 50 therein which is provided with a slidable valve spool 52 having three cannelures 54, 56, and 58 thereon, thus forming a pair of lands 60 and 62. Body 38 is provided with a central pressure port 64 and a pair of motor ports 66 and 68. End cap 40 has a return port 70 therein.

In the central position of spool 52, as illustrated, an open-center condition exists, that is, pressure port 64 is in fluid communication with the return port 70 across lands 60 and 62, which have suitably tapered edges for that purpose, through radial passages 72 and 74, the central axial passage 76, and radial passages 78. It is also apparent that motor ports 66 and 68 both are connected to return port 70 when valve 52 is in the center position as shown. Movement of valve 52 will produce a pressure increase in one of the motor ports 66 or 68, in a manner well known in the art, thus producing hydraulic steering force at the motor 24.

Pitman arm 32 is provided with a ball stud 80 which is clamped between a pair of ball seats 82 carried by a sleeve 84. Sleeve 84 is axially slidable in sleeve 42, which is secured to the body 38 as aforesaid, to an extent determined by its endwise abutment with the body face 86 or the shoulder 88. Relative axial motion between spool 52 and sleeve 84 is prevented by a C washer 90 which engages a groove 92 in the spool 52, and is clamped between a spacer 94 and the inwardly flanged end 96 of sleeve 84.

Valve spool 52 is spring centered in bore 50 by a nested pair of springs 98 and 100 which, though of different diameters, preferably have the same rate and assembled load so that resistance to movement by spool 52 is the same in either direction. Spool 52 has a pair of spaced apart abutments 102 and 104 thereon which are provided by, for example, a C washer 103 and a nut 105. Spring 100 acting against abutment 102 biases abutment 104 into endwise engagement with face 106 of an axially floatable collar 108, and spring 98 biases collar 108 against an axially adjustable stop 110 in the end cap 40 provided with a lock nut 112 and sealed against leakage from the cap by an O ring seal 114.

It can be seen that the assembled load of the spring 100 must be overcome to shift spool 52 to the left relative to the body 38, and that of spring 98 must be overcome to shift the spool to the right. Springs 98 and 100 thus form a resilient coupling between relatively movable members which may be termed input and output members. The input member comprises valve spool 52 and those parts positively translatable therewith, including abutments 102 and 104, C washer 90, and the sleeve 84. The output member comprises body 38 and those parts positively translatable therewith, including end cap 40 and sleeve 42. The normal spring centered position of spool 52 relative to the body 38 is thus easily adjustable by simply varying the axial location of the stop 110 in the end cap 40.

Stepped valve bore 50 includes an enlarged portion 116 having a reaction piston 118 in axial sliding fluid sealing engagement therewith. Reaction piston 118 encircles a reduced portion 120 of valve spool 52 in slidable fluid sealing engagement therewith and has a spherical portion 122 cooperating with a spherical seat in a washer 124. Washer 124 normally abuts against the shoulder 126 formed by a washer 128 sandwiched between the end cap 40 and the body 38. The spherical contact between washer 124 and piston 118 is to prevent any possible lack of perpendicularity between the shoulder 126 and the axis of bore 50 from causing binding of piston 118. For practical purposes, however, washer 124 may be regarded as a part of piston 118. C washer 103 on the valve spool 52 is encircled by the central aperture in washer 128, thus permitting the abutment 129 also to contact washer 124. There is thus provided a reaction pressure chamber 130 which is connected to the pressure port 64 by a passage 132. It is apparent that the pressure in port 64, and consequently that in chamber 130, varies directly with the amount of hydraulically produced steering force being applied to the dirigible wheel 28.

Pressure in chamber 130 tends to position spool 52 relative to shoulder 126. That is, pressure in chamber 132 acts on the annular effective area 136 of piston 118 to bias the piston and washer 124 into engagement with shoulder 126, while at the same time acting on annular effective area 134 on spool 52 to bias the abutment 129 on the spool against washer 128.

Pressure in chamber 130 acts to create a force proportional to the hydraulically produced steering force to aid springs 98 and 100 in resisting movement of spool 52 thereby providing control with "feel." For example, if spool 52 is shifted to the left, spring 100 must be overcome, and pressure existing in chamber 130, which is proportional to the hydraulically produced steering force, will act on the annular effective area 134 producing a force on the spool 52 aiding spring 100. If spool 52 is shifted to the right, spring 98 must be overcome and pressure in chamber 130 will act on the large annular area 136 of the piston 118, as well as the area 134, producing a net force on spool 52 aiding spring 98.

The areas 136 and 134 may be in a ratio of 2:1 in which case any given pressure in chamber 130 will exert equal centering force on spool 52 in either direction. However, to provide proper feel in both directions, the ratio of the difference between the areas 136 and 134 to area 134 should equal the ratio of the effective area of motor 24 exposed to pressure in port 23 to the effective area of motor 24 exposed to pressure in port 25. Thus any given pressure in chamber 132 will exert a centering force on spool 52 dependent on the steering force that pressure is producing at the motor 24.

In operation, the vehicle operator may apply a steering movement to the pitman arm 32 and ball stud 80 through a conventional steering wheel and gear. The resistance encountered by the dirigible wheels 28 determines the action of valve 16. If that resistance is slight valve 16 may act as merely a mechanical link in the steering mechanism. For example, if wheel 28 turns easily the resilient coupling between the input and output members provided by springs 98 and 100 may transmit the entire driving force and permit no relative motion between those two members. If, however, wheel 28 encounters any considerable resistance to movement, either spring 98 or 100 will be overcome and the input member will move relative to the output member, thus causing pressure increase in one of the motor ports 66 or 68, as heretofore described, to produce a hydraulic steering force at motor 24. This pressure increase is utilized in chamber 130 to produce a reaction force, thus providing "feel" as previously described.

In case of a power failure in the hydraulic system, safety of the vehicle and its passengers is insured by the provision for direct mechanical steering resulting from the abutment of sleeve 84 against the shoulder 86 or 88 which limits relative movement between the input and output members.

The relative movement required between the valve spool 52 and the body 40 to produce a hydraulic steering force is very slight. It consequently becomes important that the valve spool 52 be biased to a center position, relative to the motor ports 66 and 68, which is quite critically located. If, after assembly and installation, the valve 16 is not properly centered, a rapid accurate one operation adjustment is possible by merely shifting the adjustable stop 110 in the end cap 40.

There has thus been provided a low cost control valve providing follow-up action and "feel" and having a spring centered valve spool, the center position of which is adjustable by a single simple operation.

While the form of embodiment of the invention as herein disclosed constitutes a preferred form, it is to be understood that other forms might be adopted, all coming within the scope of the claims which follow.

What is claimed is as follows:

1. In a control valve having a relatively movable body and spool, a device for resiliently centering said body and spool comprising: a pair of spaced apart abutments on said spool; a collar floatable between said abutments, an adjustable stop in the body; a first resilient means to bias said collar against said stop; and a second resilient means acting between said collar and one of said abutments to bias the other abutment against said collar.

2. In a control valve having a relatively movable body and spool, a device for resiliently centering said body in the spool comprising: a pair of spaced apart abutments on said spool; a collar floatable between said abutments, an adjustable stop in the body; means for adjusting said stop from the exterior of said body, first resilient means to bias said collar against said stop; second resilient means acting between said collar and one of said abutments to bias the other abutment against said collar.

3. In a control valve having a relatively movable body and spool, a device for resiliently centering said body and spool comprising: a pair of spaced abutments on the spool; a collar floatable between said abutments; a stop in the body; a first resilient means acting between the collar and the body to bias the collar against the stop; a second resilient means acting between the collar and one of said abutments to bias the other abutment against the collar; and means for adjustably positioning the stop in the body, whereby adjustment of the stop causes complete adjustment of the resiliently centered position of the spool by effecting the conjoint shifting of all points of abutment contact which locate that position.

4. In a control valve having a relatively movable body and spool, a device for resiliently centering said body and spool comprising: a pair of spaced abutments on the spool; a collar floatable between said abutments; a stop in the body; first and second resilient biasing means having substantially the same rate and assembled load, said first means being larger in diameter and encircling said second means and acting between the collar and body to bias the collar against the stop, said second means acting between the collar and one of said abutments to bias the other abutment against the collar; and means for adjustably positioning the stop in the body, whereby adjustment of the stop causes complete adjustment of the resiliently centered position of the spool by effecting the conjoint shifting of all points of abutment contact which locate that position.

5. In a control valve having a relatively movable body and spool, a device for resiliently centering said body and spool comprising: a pair of spaced abutments on the spool; a collar floatable between said abutments; a stop in the body; first and second resilient biasing means having substantially the same rate and assembled load, said first means being larger in diameter and encircling said second means and acting between the collar and body to bias the collar in one direction against the stop, said second means acting between the collar and one of said abutments to bias the other abutment in the direction opposite said one direction and against the collar; and means for adjustably positioning the stop in the body, whereby adjustment of the stop causes complete adjustment of the resiliently centered position of the spool by effecting the conjoint shifting of all points of abutment contact which locate that position.

6. In a control valve having a relatively movable body and spool, a combination of means for resilient mechanical centering and means for hydraulic centering of said body in the spool comprising: means forming first and second spaced apart abutments on said spool; an axially floatable collar between said first and second abutments; first mechanical resilient means to bias said collar against said body; second mechanical resilient means acting between said collar and said first abutment to bias said second abutment against said collar; a third abutment on said spool; an effective area on said spool; an axially floatable piston slidable into engagement with said third abutment encircling said spool between that third abutment and said pressure effective area; a pressure chamber between said piston and said pressure effective area; a stop on said body against which said piston is biased by pressure in said chamber, and means for supplying pressure fluid to said pressure chamber.

7. In a control valve having a relatively movable body and spool, a combination of means for resilient mechanical centering and means for hydraulic centering of said body in the spool comprising: means forming first and second spaced apart abutments on said spool; an axially floatable collar between said first and second abutments; first mechanical resilient means to bias said collar against said body; second mechanical resilient means acting between said collar and said first abutment to bias said second abutment against said collar; a third abutment on said spool, comprising an opposing face of the means forming said first abutment; an effective area on said spool; an axially floatable piston slidable into engagement with said third abutment encircling said spool between that third abutment and said pressure effective area; a pressure chamber between said piston and said pressure effective area; a stop on said body against which said piston is biased by pressure in said chamber; and means for supplying pressure fluid to said pressure chamber.

8. In a servo control system: a steering element and a steered element; a control valve having inlet means, outlet means, and cylinder port means and having relatively movable input and output members with a neutral central position, one member being connected to said steering element and the other to said steered element; a double-acting fluid motor connected to exert force on said steered element, said motor being connected to said cylinder port means and controlled by actuating pressure directed thereto by said control valve; means for hydraulically centering said input and output members comprising a pressure chamber, a small effective area on one of said members exposed to said chamber, piston means shiftable relative to both members having a relatively large effective area exposed to said chamber in axial opposition to said small effective area, an abutment on each of said members to contact said piston, and fluid passage means for establishing communication between said pressure chamber and said inlet means.

9. In a servo control system: a steering element and a steered element; a control valve having inlet means, outlet means, and cylinder port means and having relatively movable input and output members with a neutral central position, one member being connected to said steering element and the other to said steered element; a double-acting fluid motor having a pair of opposed effective areas and connected to exert force on said steered element, said motor being connected to said cylinder port means and controlled by actuating pressure directed thereto by said control valve; and means for hydraulically centering said input and output members comprising a pressure chamber, a small area on one of said members exposed to said chamber, and piston means shiftable relative to both members having a relatively large area exposed to said chamber in axial opposition to said small area, said large and small areas being so proportioned that the ratio of their difference to the small area equals the ratio of one of said pair of effective areas to the other of said pair, an abutment on each of said members to contact said piston, and fluid passage means for establishing communication between said pressure chamber and said inlet means.

10. In a control valve for use in a servo system: inlet port means; outlet port means; cylinder port means for connection to a fluid motor; a body and spool relatively movable to affect communication between said inlet port means and said cylinder port means; an abutment on said spool; a pressure responsive area on said spool; an axially floatable piston, slidable into engagement with said abutment and encircling said spool between said abutment and said pressure responsive area; a pressure chamber between said piston and said pressure responsive area; a stop on the body against which said piston is biased by pressure in said chamber; and fluid passage means establishing communication between said pressure chamber and said inlet port means, whereby hydraulic feel is provided.

11. In an open center control valve for use in a servo system: inlet port means; outlet port means; cylinder port means for connection to a fluid motor; a body and spool relatively movable to affect communication between said inlet port means and said cylinder port means; an abutment on said spool; a pressure responsive area on said spool; an axially floatable piston, slidable into engagement with said abutment and encircling said spool between said abutment and said pressure responsive area; a pressure chamber between said piston and said pressure responsive area; a stop on the body against which said piston is biased by pressure in said chamber; and fluid passage means establishing communication between said pressure chamber and said inlet port means, whereby hydraulic feel is provided.

12. In an open center control valve for use in a servo system: a body; a supply pressure connection port in said body; a pair of motor ports in said body; a spool in said body movable relative thereto to conjointly, inversely affect communication between said supply port and said pair of motor ports; an abutment on said spool; a pressure responsive area on said spool; an axially floatable piston, slidable into engagement with said abutment and encircling said spool between said abutment and said pressure responsive area; a pressure chamber between said piston and said pressure responsive area; a stop on the body against which said piston is biased by pressure in said chamber; and fluid passage means establishing communication between said pressure chamber and said supply port, whereby hydraulic feel is provided.

13. In a control valve for use in a servo system: inlet port means; outlet port means; cylinder port means for connection to a fluid motor; a body and spool relatively movable to affect communication between said inlet port means and said cylinder port means; an abutment on said spool; a pressure responsive area on said spool; an axially floatable piston, slidable into engagement with said abutment and encircling said spool between said abutment and said pressure responsive area; means forming a single pressure chamber, so situated as to impose the pressure therein upon both said piston and said pressure responsive area on the spool; a stop on the body disposed to engage said piston, and fluid passage means establishing communication between said pressure chamber and said inlet port means, whereby pressure in the chamber biases said body and spool toward a neutral central position established by engagement of said stop and piston and said abutment and piston, the magnitude of the biasing force being dependent on the pressure in said inlet port means, whereby hydraulic feel is provided.

References Cited in the file of this patent

UNITED STATES PATENTS

| Number | Name | Date |
| --- | --- | --- |
| 787,480 | Tanner | Apr. 18, 1905 |
| 1,600,542 | Gagg | Sept. 21, 1926 |
| 2,307,910 | Baade | Jan. 12, 1943 |
| 2,361,130 | Simpson | Oct. 24, 1944 |
| 2,383,278 | Stevens | Aug. 21, 1945 |
| 2,396,643 | Ganahl et al. | Mar. 19, 1946 |
| 2,596,242 | Hill | May 13, 1952 |
| 2,608,263 | Garrison | Aug. 26, 1952 |
| 2,627,847 | Clark | Feb. 10, 1953 |